(12) United States Patent
Leijon et al.

(10) Patent No.: US 7,061,133 B1
(45) Date of Patent: *Jun. 13, 2006

(54) WIND POWER PLANT

(75) Inventors: Mats Leijon, Västerås (SE); Gunnar Kylander, Västerås (SE)

(73) Assignee: ABB AB, Vasteras (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/554,888

(22) PCT Filed: Nov. 30, 1998

(86) PCT No.: PCT/EP98/07735
§ 371 (c)(1),
(2), (4) Date: Jul. 11, 2000

(87) PCT Pub. No.: WO99/29025
PCT Pub. Date: Jun. 10, 1999

(30) Foreign Application Priority Data
Nov. 28, 1997 (GB) .............................................. 9725309

(51) Int. Cl.
F03D 9/00 (2006.01)
H02K 3/40 (2006.01)

(52) U.S. Cl. ........................ 290/44; 310/196; 310/208; 174/DIG. 15; 174/DIG. 28

(58) Field of Classification Search .................. 290/44; 310/196, 195, 179–180, 208, 184; 174/DIG. 15, 174/DIG. 28, DIG. 14, DIG. 20
See application file for complete search history.

(56) References Cited

U.S. PATENT DOCUMENTS

| | | | |
|---|---|---|---|
| 681,800 A | 9/1901 | Lasche | |
| 847,008 A | 3/1907 | Kitsee | |
| 1,304,451 A | 5/1919 | Burnham | |
| 1,418,856 A | 6/1922 | Williamson | |
| 1,481,585 A | 1/1924 | Beard | |
| 1,508,456 A | 9/1924 | Lenz | |

(Continued)

FOREIGN PATENT DOCUMENTS

| AT | 399790 | 7/1995 |
|---|---|---|
| BE | 565063 | 2/1957 |

(Continued)

OTHER PUBLICATIONS

A test installation of a self-tuned ac filter in the Konti-Skan 2 HVDC link; T. Holmgren, G. Asplund, S. Valdernarsson, P. Hidman of ABB; U. Jonsson of Svenska Kraftnat; O. loof of Vattenfall Vastsverige AB; IEEE Stockholm Power Tech Conference Jun. 1995, pp 64–70.

(Continued)

Primary Examiner—Burton Mullins
(74) Attorney, Agent, or Firm—Dykema Gossett PLLC

(57) ABSTRACT

The magnetic circuit of a generator in a wind power plant is arranged to directly supply a high supply voltage of 2–50 kV, preferably higher than 10 kV. The generator is provided with solid insulation and its winding includes a cable (6) comprising one or more current-carrying conductors (31) with a number of strands (36) surrounded by at least one outer and one inner semiconducting layer (34, 32) and intermediate insulating layers (33). The outer semiconducting layer (34) is at earth potential. The stator winding may be produced with full or fractional slot winding, the phases of the winding being Y-connected. The Y-point may be insulated and protected from over-voltage by means of surge arrestors, or else the Y-point may be earthed via a suppression filter. The invention also relates to a wind power plant, a generator included in the plant and a variable speed system for such a plant.

25 Claims, 3 Drawing Sheets

U.S. PATENT DOCUMENTS

| | | | |
|---|---|---|---|
| 1,728,915 A | 9/1929 | Blankenship et al. | |
| 1,742,985 A | 1/1930 | Burnham | |
| 1,747,507 A | 2/1930 | George | |
| 1,756,672 A | 4/1930 | Barr | |
| 1,762,775 A | 6/1930 | Ganz | |
| 1,781,308 A | 11/1930 | Vos | |
| 1,861,182 A | 5/1932 | Hendey et al. | |
| 1,891,716 A | * 12/1932 | Laffoon | 310/196 |
| 1,904,885 A | 4/1933 | Seeley | |
| 1,974,406 A | 9/1934 | Apple et al. | |
| 2,006,170 A | 6/1935 | Juhlin | |
| 2,206,856 A | 7/1940 | Shearer | |
| 2,217,430 A | 10/1940 | Baudry | |
| 2,241,832 A | 5/1941 | Wahlquist | |
| 2,251,291 A | 5/1941 | Reichelt | |
| 2,256,897 A | 9/1941 | Davidson et al. | |
| 2,295,415 A | 9/1942 | Monroe | |
| 2,409,893 A | 10/1946 | Pendleton et al. | |
| 2,415,652 A | 2/1947 | Norton | |
| 2,424,443 A | 7/1947 | Evans | |
| 2,436,306 A | 2/1948 | Johnson | |
| 2,446,999 A | 8/1948 | Camilli | |
| 2,459,322 A | 1/1949 | Johnston | |
| 2,462,651 A | 2/1949 | Lord | |
| 2,498,238 A | 2/1950 | Berberich et al. | |
| 2,650,350 A | 8/1953 | Heath | |
| 2,721,905 A | 10/1955 | Monroe | |
| 2,749,456 A | 6/1956 | Luenberger | |
| 2,780,771 A | 2/1957 | Lee | |
| 2,846,599 A | 5/1958 | McAdam | |
| 2,885,581 A | 5/1959 | Pileggi | |
| 2,943,242 A | 6/1960 | Schaschl et al. | |
| 2,947,957 A | 8/1960 | Spindler | |
| 2,959,699 A | 11/1960 | Smith et al. | |
| 2,962,679 A | 11/1960 | Stratton | |
| 2,975,309 A | 3/1961 | Seidner | |
| 3,014,139 A | 12/1961 | Shildneck | |
| 3,098,893 A | 7/1963 | Pringle et al. | |
| 3,130,335 A | 4/1964 | Rejda | |
| 3,143,269 A | 8/1964 | Van Eldik | |
| 3,157,806 A | 11/1964 | Wiedemann | |
| 3,158,770 A | 11/1964 | Coggeshall et al. | |
| 3,197,723 A | 7/1965 | Dortort | |
| 3,268,766 A | 8/1966 | Amos | |
| 3,304,599 A | 2/1967 | Nordin | |
| 3,354,331 A | 11/1967 | Broeker et al. | |
| 3,365,657 A | 1/1968 | Webb | |
| 3,372,283 A | 3/1968 | Jaecklin | |
| 3,392,779 A | 7/1968 | Tilbrook | |
| 3,411,027 A | 11/1968 | Rosenberg | |
| 3,418,530 A | 12/1968 | Cheever | |
| 3,435,262 A | 3/1969 | Bennett et al. | |
| 3,437,858 A | 4/1969 | White | |
| 3,444,407 A | 5/1969 | Yates | |
| 3,447,002 A | 5/1969 | Ronnevig | |
| 3,484,690 A | 12/1969 | Wald | |
| 3,541,221 A | 11/1970 | Aupoix et al. | |
| 3,560,777 A | 2/1971 | Moeller | |
| 3,571,690 A | 3/1971 | Lataisa | |
| 3,593,123 A | 7/1971 | Williamson | |
| 3,631,519 A | 12/1971 | Salahshourian | |
| 3,644,662 A | 2/1972 | Salahshourian | |
| 3,651,244 A | 3/1972 | Silver et al. | |
| 3,651,402 A | 3/1972 | Leffmann | |
| 3,660,721 A | 5/1972 | Baird | |
| 3,666,876 A | 5/1972 | Forster | |
| 3,670,192 A | 6/1972 | Andersson et al. | |
| 3,675,056 A | 7/1972 | Lenz | |
| 3,684,821 A | 8/1972 | Miyauchi et al. | |
| 3,684,906 A | 8/1972 | Lexz | |
| 3,699,238 A | 10/1972 | Hansen et al. | |
| 3,716,652 A | 2/1973 | Lusk et al. | |
| 3,716,719 A | 2/1973 | Angelery et al. | |
| 3,727,085 A | 4/1973 | Goetz et al. | |
| 3,740,600 A | 6/1973 | Turley | |
| 3,743,867 A | 7/1973 | Smith, Jr. | |
| 3,746,954 A | 7/1973 | Myles et al. | |
| 3,758,699 A | 9/1973 | Lusk et al. | |
| 3,778,891 A | 12/1973 | Amasino et al. | |
| 3,781,739 A | 12/1973 | Meyer | |
| 3,787,607 A | 1/1974 | Schlafly | |
| 3,792,399 A | 2/1974 | McLyman | |
| 3,801,843 A | 4/1974 | Corman et al. | |
| 3,809,933 A | 5/1974 | Sugawara et al. | |
| 3,813,764 A | 6/1974 | Tanaka et al. | |
| 3,828,115 A | 8/1974 | Hvizd, Jr. | |
| 3,881,647 A | 5/1975 | Wolfe | |
| 3,884,154 A | 5/1975 | Marten | |
| 3,891,880 A | 6/1975 | Britsch | |
| 3,902,000 A | 8/1975 | Forsyth et al. | |
| 3,912,957 A | 10/1975 | Reynolds | |
| 3,932,779 A | 1/1976 | Madsen | |
| 3,932,791 A | 1/1976 | Oswald | |
| 3,943,392 A | 3/1976 | Keuper et al. | |
| 3,947,278 A | 3/1976 | Youtsey | |
| 3,965,408 A | 6/1976 | Higuchi et al. | |
| 3,968,388 A | 7/1976 | Lambrecht et al. | |
| 3,971,543 A | 7/1976 | Shanahan | |
| 3,974,314 A | 8/1976 | Fuchs | |
| 3,993,860 A | 11/1976 | Snow et al. | |
| 3,995,785 A | 12/1976 | Arick et al. | |
| 4,001,616 A | 1/1977 | Lonseth et al. | |
| 4,008,367 A | 2/1977 | Sunderhauf | |
| 4,008,409 A | 2/1977 | Rhudy et al. | |
| 4,031,310 A | 6/1977 | Jachimowicz | |
| 4,039,740 A | 8/1977 | Iwata | |
| 4,041,431 A | 8/1977 | Enoksen | |
| 4,047,138 A | 9/1977 | Steigerwald | |
| 4,064,419 A | 12/1977 | Peterson | |
| 4,084,307 A | 4/1978 | Schultz et al. | |
| 4,085,347 A | 4/1978 | Lichius | |
| 4,088,953 A | 5/1978 | Sarian | |
| 4,091,138 A | 5/1978 | Takagi et al. | |
| 4,091,139 A | 5/1978 | Quirk | |
| 4,099,227 A | 7/1978 | Liptak | |
| 4,103,075 A | 7/1978 | Adam | |
| 4,106,069 A | 8/1978 | Trautner et al. | |
| 4,107,092 A | 8/1978 | Carnahan et al. | |
| 4,109,098 A | 8/1978 | Olsson et al. | |
| 4,121,148 A | 10/1978 | Platzer | |
| 4,132,914 A | 1/1979 | Khutoretsky | |
| 4,134,036 A | 1/1979 | Curtiss | |
| 4,134,055 A | 1/1979 | Akamatsu | |
| 4,134,146 A | 1/1979 | Stetson | |
| 4,149,101 A | 4/1979 | Lesokhin et al. | |
| 4,152,615 A | 5/1979 | Calfo et al. | |
| 4,160,193 A | 7/1979 | Richmond | |
| 4,164,672 A | 8/1979 | Flick | |
| 4,164,772 A | 8/1979 | Hingorani | |
| 4,177,397 A | 12/1979 | Lill | |
| 4,177,418 A | 12/1979 | Brueckner et al. | |
| 4,184,186 A | 1/1980 | Barkan | |
| 4,200,817 A | 4/1980 | Bratoljic | |
| 4,200,818 A | 4/1980 | Ruffing et al. | |
| 4,206,434 A | 6/1980 | Hase | |
| 4,207,427 A | 6/1980 | Beretta et al. | |
| 4,207,482 A | 6/1980 | Neumeyer et al. | |
| 4,208,597 A | 6/1980 | Mulach et al. | |
| 4,229,721 A | 10/1980 | Koloczek et al. | |
| 4,238,339 A | 12/1980 | Khutoretsky et al. | |
| 4,239,999 A | 12/1980 | Vinokurov et al. | |

| Patent No. | Date | Inventor(s) | Patent No. | Date | Inventor(s) |
|---|---|---|---|---|---|
| 4,245,182 A | 1/1981 | Aotsu et al. | 4,615,109 A | 10/1986 | Wcislo et al. |
| 4,246,694 A | 1/1981 | Raschbichler et al. | 4,615,778 A | 10/1986 | Elton |
| 4,255,684 A | 3/1981 | Mischler et al. | 4,618,795 A | 10/1986 | Cooper et al. |
| 4,258,280 A | 3/1981 | Starcevic | 4,619,040 A | 10/1986 | Wang et al. |
| 4,262,209 A | 4/1981 | Berner | 4,622,116 A | 11/1986 | Elton et al. |
| 4,274,027 A | 6/1981 | Higuchi et al. | 4,633,109 A | 12/1986 | Feigel |
| 4,281,264 A | 7/1981 | Keim et al. | 4,650,924 A | 3/1987 | Kauffman et al. |
| 4,292,558 A | 9/1981 | Flick et al. | 4,652,963 A | 3/1987 | Fahlen |
| 4,307,311 A | 12/1981 | Grozinger | 4,656,316 A | 4/1987 | Meltsch |
| 4,308,476 A | 12/1981 | Schuler | 4,656,379 A | 4/1987 | McCarty |
| 4,308,575 A | 12/1981 | Mase | 4,677,328 A | 6/1987 | Kumakura |
| 4,310,966 A | 1/1982 | Breitenbach | 4,687,882 A | 8/1987 | Stone et al. |
| 4,314,168 A | 2/1982 | Breitenbach | 4,692,731 A | 9/1987 | Osinga |
| 4,317,001 A | 2/1982 | Silver et al. | 4,723,083 A | 2/1988 | Elton |
| 4,320,645 A | 3/1982 | Stanley | 4,723,104 A | 2/1988 | Rohatyn |
| 4,321,426 A | 3/1982 | Schaeffer | 4,724,345 A | 2/1988 | Elton et al. |
| 4,321,518 A | 3/1982 | Akamatsu | 4,732,412 A | 3/1988 | van der Linden et al. |
| 4,330,726 A | 5/1982 | Albright et al. | 4,737,704 A | 4/1988 | Kalinnikov et al. |
| 4,337,922 A | 7/1982 | Streiff et al. | 4,745,314 A | 5/1988 | Nakano |
| 4,341,989 A | 7/1982 | Sandberg et al. | 4,761,602 A | 8/1988 | Leibovich |
| 4,347,449 A | 8/1982 | Beau | 4,766,365 A | 8/1988 | Bolduc et al. |
| 4,347,454 A | 8/1982 | Gellert et al. | 4,771,168 A | 9/1988 | Gundersen et al. |
| 4,357,542 A | 11/1982 | Kirschbaum | 4,785,138 A | 11/1988 | Breitenbach et al. |
| 4,360,748 A | 11/1982 | Raschbichler et al. | 4,795,933 A | 1/1989 | Sakai |
| 4,361,723 A | 11/1982 | Hvizd, Jr. et al. | 4,827,172 A | 5/1989 | Kobayashi |
| 4,363,612 A | 12/1982 | Walchhutter | 4,845,308 A | 7/1989 | Womack, Jr. et al. |
| 4,365,178 A | 12/1982 | Lexz | 4,847,747 A | 7/1989 | Abbondanti |
| 4,367,425 A | 1/1983 | Mendelsohn et al. | 4,853,565 A | 8/1989 | Elton et al. |
| 4,367,890 A | 1/1983 | Spirk | 4,859,810 A | 8/1989 | Cloetens et al. |
| 4,368,418 A | 1/1983 | DeMello et al. | 4,859,989 A | 8/1989 | McPherson |
| 4,369,389 A | 1/1983 | Lambrecht | 4,860,430 A | 8/1989 | Raschbichler et al. |
| 4,371,745 A | 2/1983 | Sakashita | 4,864,266 A | 9/1989 | Feather et al. |
| 4,384,944 A | 5/1983 | Silver et al. | 4,883,230 A | 11/1989 | Lindstrom |
| 4,387,316 A | 6/1983 | Katsekas | 4,890,040 A | 12/1989 | Gundersen |
| 4,401,920 A | 8/1983 | Taylor et al. | 4,894,284 A | 1/1990 | Yamanouchi et al. |
| 4,403,163 A | 9/1983 | Rarmerding et al. | 4,914,386 A | 4/1990 | Zocholl |
| 4,404,486 A | 9/1983 | Keim et al. | 4,918,347 A | 4/1990 | Takaba |
| 4,411,710 A | 10/1983 | Mochizuki et al. | 4,918,835 A | 4/1990 | Raschbichler et al. |
| 4,421,284 A | 12/1983 | Pan | 4,924,342 A | 5/1990 | Lee |
| 4,425,521 A | 1/1984 | Rosenberry, Jr. et al. | 4,926,079 A | 5/1990 | Niemela et al. |
| 4,426,771 A | 1/1984 | Wang et al. | 4,942,326 A | 7/1990 | Butler, III et al. |
| 4,429,244 A | 1/1984 | Nikitin et al. | 4,949,001 A | 8/1990 | Campbell |
| 4,431,960 A | 2/1984 | Zucker | 4,982,147 A | 1/1991 | Lauw |
| 4,432,029 A | 2/1984 | Lundqvist | 4,994,952 A | 2/1991 | Silva et al. |
| 4,437,464 A | 3/1984 | Crow | 4,997,995 A | 3/1991 | Simmons et al. |
| 4,443,725 A | 4/1984 | Derderian et al. | 5,012,125 A | 4/1991 | Conway |
| 4,470,884 A | 9/1984 | Carr | 5,030,813 A | 7/1991 | Stanisz |
| 4,473,765 A | 9/1984 | Butman, Jr. et al. | 5,036,165 A | 7/1991 | Elton et al. |
| 4,475,075 A | 10/1984 | Munn | 5,036,238 A | 7/1991 | Tajima |
| 4,477,690 A | 10/1984 | Nikitin et al. | 5,066,881 A | 11/1991 | Elton et al. |
| 4,481,438 A | 11/1984 | Keim | 5,067,046 A | 11/1991 | Elton et al. |
| 4,484,106 A | 11/1984 | Taylor et al. | 5,083,360 A | 1/1992 | Valencic et al. |
| 4,488,079 A | 12/1984 | Dailey et al. | 5,086,246 A | 2/1992 | Dymond et al. |
| 4,490,651 A | 12/1984 | Taylor et al. | 5,091,609 A | 2/1992 | Sawada et al. |
| 4,503,284 A | 3/1985 | Minnick et al. | 5,094,703 A | 3/1992 | Takaoka et al. |
| 4,508,251 A | 4/1985 | Harada et al. | 5,095,175 A | 3/1992 | Yoshida et al. |
| 4,510,077 A | 4/1985 | Elton | 5,097,241 A | 3/1992 | Smith et al. |
| 4,517,471 A | 5/1985 | Sachs | 5,097,591 A | 3/1992 | Wcislo et al. |
| 4,520,287 A | 5/1985 | Wang et al. | 5,111,095 A | 5/1992 | Hendershot |
| 4,523,249 A | 6/1985 | Arimoto | 5,124,607 A | 6/1992 | Rieber et al. |
| 4,538,131 A | 8/1985 | Baier et al. | 5,136,459 A | 8/1992 | Fararooy |
| 4,546,210 A | 10/1985 | Akiba et al. | 5,140,290 A | 8/1992 | Dersch |
| 4,551,780 A | 11/1985 | Canay | 5,153,460 A | 10/1992 | Bovino et al. |
| 4,557,038 A | 12/1985 | Wcislo et al. | 5,168,662 A | 12/1992 | Nakamura et al. |
| 4,560,896 A | 12/1985 | Vogt et al. | 5,171,941 A | 12/1992 | Shimizu et al. |
| 4,565,929 A | 1/1986 | Baskin et al. | 5,182,537 A | 1/1993 | Thuis |
| 4,571,453 A | 2/1986 | Takaoka et al. | 5,187,428 A | 2/1993 | Hutchison et al. |
| 4,588,916 A | 5/1986 | Lis | 5,231,249 A | 7/1993 | Kimura et al. |
| 4,590,416 A | 5/1986 | Porche et al. | 5,235,488 A | 8/1993 | Koch |
| 4,594,630 A | 6/1986 | Rabinowitz et al. | 5,246,783 A | 9/1993 | Spenadel et al. |
| 4,607,183 A | 8/1986 | Rieber et al. | 5,264,778 A | 11/1993 | Kimmel et al. |

| | | | | | | |
|---|---|---|---|---|---|---|
| 5,287,262 A | 2/1994 | Klein | | DE | 629301 | 4/1936 |
| 5,304,883 A | 4/1994 | Denk | | DE | 673545 | 3/1939 |
| 5,305,961 A | 4/1994 | Errard et al. | | DE | 719009 | 3/1942 |
| 5,321,308 A | 6/1994 | Johncock | | DE | 846583 | 8/1952 |
| 5,323,330 A | 6/1994 | Asplund et al. | | DE | 875227 | 4/1953 |
| 5,325,008 A | 6/1994 | Grant | | DE | 975999 | 1/1963 |
| 5,325,259 A | 6/1994 | Paulsson | | DE | 1465719 | 5/1969 |
| 5,327,637 A | 7/1994 | Britenbach et al. | | DE | 1807391 | 5/1970 |
| 5,341,281 A | 8/1994 | Skibinski | | DE | 2050674 | 5/1971 |
| 5,343,139 A | 8/1994 | Gyugyi et al. | | DE | 1638176 | 6/1971 |
| 5,355,046 A | 10/1994 | Weigelt | | DE | 2155371 | 5/1973 |
| 5,365,132 A | 11/1994 | Hann et al. | | DE | 2400698 | 7/1975 |
| 5,387,890 A | 2/1995 | Estop et al. | | DE | 2520511 | 11/1976 |
| 5,397,513 A | 3/1995 | Steketee, Jr. | | DE | 2656389 | 6/1978 |
| 5,399,941 A | 3/1995 | Grothaus et al. | | DE | 2721905 | 11/1978 |
| 5,400,005 A | 3/1995 | Bobry | | DE | 137164 | 8/1979 |
| 5,408,169 A | 4/1995 | Jeanneret | | DE | 138840 | 11/1979 |
| 5,449,861 A | 9/1995 | Fujino et al. | | DE | 2824951 | 12/1979 |
| 5,452,170 A | 9/1995 | Ohde et al. | | DE | 2835386 | 2/1980 |
| 5,468,916 A | 11/1995 | Litenas et al. | | DE | 2839517 | 3/1980 |
| 5,499,178 A | 3/1996 | Mohan | | DE | 2854520 | 6/1980 |
| 5,500,632 A | 3/1996 | Halser, III | | DE | 3009102 | 9/1980 |
| 5,510,942 A | 4/1996 | Bock et al. | | DE | 2913697 | 10/1980 |
| 5,530,307 A | 6/1996 | Horst | | DE | 2920478 | 12/1980 |
| 5,533,658 A | 7/1996 | Benedict et al. | | DE | 3028777 | 3/1981 |
| 5,534,754 A | 7/1996 | Poumey | | DE | 2939004 | 4/1981 |
| 5,545,853 A | 8/1996 | Hildreth | | DE | 3006382 | 8/1981 |
| 5,550,410 A | 8/1996 | Titus | | DE | 3008818 | 9/1981 |
| 5,583,387 A | 12/1996 | Takeuchi et al. | | DE | 209313 | 4/1984 |
| 5,587,126 A | 12/1996 | Steketee, Jr. | | DE | 3305225 | 8/1984 |
| 5,598,137 A | 1/1997 | Alber et al. | | DE | 3309051 | 9/1984 |
| 5,607,320 A | 3/1997 | Wright | | DE | 3441311 | 5/1986 |
| 5,612,510 A | 3/1997 | Hildreth | | DE | 3543106 | 6/1987 |
| 5,663,605 A | 9/1997 | Evans et al. | | DE | 2917717 | 8/1987 |
| 5,672,926 A | 9/1997 | Brandes et al. | | DE | 3612112 | 10/1987 |
| 5,689,223 A | 11/1997 | Demarmels et al. | | DE | 3726346 | 2/1989 |
| 5,807,447 A | 9/1998 | Forrest | | DE | 3925337 | 2/1991 |
| 5,834,699 A | 11/1998 | Buck et al. | | DE | 4023903 | 11/1991 |
| | | | | DE | 4022476 | 1/1992 |
| FOREIGN PATENT DOCUMENTS | | | | DE | 4233558 | 3/1994 |
| CH | | 391071 | 4/1965 | DE | 4402184 | 8/1995 |
| CH | | 266037 | 10/1965 | DE | 4409794 | 8/1995 |
| CH | | 534448 | 2/1973 | DE | 4412761 | 10/1995 |
| CH | | 539328 | 7/1973 | DE | 4420322 | 12/1995 |
| CH | | 646403 | 2/1979 | DE | 4438186 | 1/1996 |
| CH | | 657482 | 8/1986 | DE | 19620906 | 1/1996 |
| CH | | 1189322 | 10/1986 | DE | 19020222 | 3/1997 |
| DE | | 40414 | 8/1887 | DE | 19547229 | 6/1997 |
| DE | | 277012 | 7/1914 | DE | 468827 | 7/1997 |
| DE | | 336418 | 6/1920 | DE | 134022 | 12/2001 |
| DE | | 372390 | 3/1923 | EP | 049104 | 4/1982 |
| DE | | 386561 | 12/1923 | EP | 0493704 | 4/1982 |
| DE | | 387973 | 1/1924 | EP | 0056580 A1 | 7/1982 |
| DE | | 406371 | 11/1924 | EP | 078908 | 5/1983 |
| DE | | 425551 | 2/1926 | EP | 0120154 | 10/1984 |
| DE | | 426793 | 3/1926 | EP | 0130124 | 1/1985 |
| DE | | 432169 | 7/1926 | EP | 0142813 | 5/1985 |
| DE | | 433749 | 9/1926 | EP | 0155405 | 9/1985 |
| DE | | 435608 | 10/1926 | EP | 0102513 | 1/1986 |
| DE | | 435609 | 10/1926 | EP | 0174783 | 3/1986 |
| DE | | 441717 | 3/1927 | EP | 0185788 | 7/1986 |
| DE | | 443011 | 4/1927 | EP | 0277358 | 8/1986 |
| DE | | 460124 | 5/1928 | EP | 0234521 | 9/1987 |
| DE | | 482506 | 9/1929 | EP | 0244069 | 11/1987 |
| DE | | 501181 | 7/1930 | EP | 0246377 | 11/1987 |
| DE | | 523047 | 4/1931 | EP | 0265868 | 5/1988 |
| DE | | 568508 | 1/1933 | EP | 0274691 | 7/1988 |
| DE | | 572030 | 3/1933 | EP | 0280759 | 9/1988 |
| DE | | 584639 | 9/1933 | EP | 0282876 | 9/1988 |
| DE | | 586121 | 10/1933 | EP | 0309096 | 3/1989 |
| DE | | 604972 | 11/1934 | EP | 0314860 | 5/1989 |

| | | | | | |
|---|---|---|---|---|---|
| EP | 0316911 | 5/1989 | GB | 1024583 | 3/1966 |
| EP | 0317248 | 5/1989 | GB | 1053337 | 12/1966 |
| EP | 0335430 | 10/1989 | GB | 1059123 | 2/1967 |
| EP | 0342554 | 11/1989 | GB | 1103098 | 2/1968 |
| EP | 0221404 | 5/1990 | GB | 1103099 | 2/1968 |
| EP | 0375101 | 6/1990 | GB | 1117401 | 6/1968 |
| EP | 0406437 | 1/1991 | GB | 1135242 | 12/1968 |
| EP | 0439410 | 7/1991 | GB | 1147049 | 4/1969 |
| EP | 0440865 | 8/1991 | GB | 1157885 | 7/1969 |
| EP | 0469155 A1 | 2/1992 | GB | 1174659 | 12/1969 |
| EP | 0490705 | 6/1992 | GB | 1236082 | 6/1971 |
| EP | 0503817 | 9/1992 | GB | 1268770 | 3/1972 |
| EP | 0571155 | 11/1993 | GB | 1319257 | 6/1973 |
| EP | 0620570 | 10/1994 | GB | 1322433 | 7/1973 |
| EP | 0620630 | 10/1994 | GB | 1340983 | 12/1973 |
| EP | 0642027 | 3/1995 | GB | 1341050 | 12/1973 |
| EP | 0671632 | 9/1995 | GB | 1365191 | 8/1974 |
| EP | 0676777 | 10/1995 | GB | 1395152 | 5/1975 |
| EP | 0677915 | 10/1995 | GB | 1424982 | 2/1976 |
| EP | 0684679 | 11/1995 | GB | 1426594 | 3/1976 |
| EP | 0684682 | 11/1995 | GB | 1438610 | 6/1976 |
| EP | 0695019 | 1/1996 | GB | 1445284 | 8/1976 |
| EP | 0732787 | 9/1996 | GB | 1479904 | 7/1977 |
| EP | 0738034 | 10/1996 | GB | 1493163 | 11/1977 |
| EP | 0739087 A2 | 10/1996 | GB | 1502938 | 3/1978 |
| EP | 0740315 | 10/1996 | GB | 1525745 | 9/1978 |
| EP | 0749190 A2 | 12/1996 | GB | 2000625 | 1/1979 |
| EP | 0751605 | 1/1997 | GB | 1548633 | 7/1979 |
| EP | 0739087 A3 | 3/1997 | GB | 2046142 | 11/1979 |
| EP | 0749193 A3 | 3/1997 | GB | 2022327 | 12/1979 |
| EP | 0780926 | 6/1997 | GB | 2025150 | 1/1980 |
| EP | 0802542 | 10/1997 | GB | 2034101 | 5/1980 |
| EP | 0913912 A1 | 5/1999 | GB | 1574796 | 9/1980 |
| FR | 805544 | 4/1936 | GB | 2070341 | 9/1981 |
| FR | 841351 | 1/1938 | GB | 2070470 | 9/1981 |
| FR | 847899 | 12/1938 | GB | 2071433 | 9/1981 |
| FR | 916959 | 12/1946 | GB | 2081523 | 2/1982 |
| FR | 1011924 | 4/1949 | GB | 2099635 | 12/1982 |
| FR | 1126975 | 3/1955 | GB | 2105925 | 3/1983 |
| FR | 1238795 | 7/1959 | GB | 2106306 | 4/1983 |
| FR | 2108171 | 5/1972 | GB | 2106721 | 4/1983 |
| FR | 2251938 | 6/1975 | GB | 2136214 | 9/1984 |
| FR | 2305879 | 10/1976 | GB | 2140195 | 11/1984 |
| FR | 2376542 | 7/1978 | GB | 2150153 | 6/1985 |
| FR | 2467502 | 4/1981 | GB | 2268337 | 1/1994 |
| FR | 2481531 | 10/1981 | GB | 2273819 | 6/1994 |
| FR | 2556146 | 6/1985 | GB | 2283133 | 4/1995 |
| FR | 2594271 | 8/1987 | GB | 2289992 | 12/1995 |
| FR | 2708157 | 1/1995 | GB | 2308490 | 6/1997 |
| GB | 268271 | 3/1927 | GB | 2332557 | 6/1999 |
| GB | 293861 | 11/1928 | GB | 123906 | 11/2001 |
| GB | 292999 | 4/1929 | HU | 175494 | 11/1981 |
| GB | 319313 | 7/1929 | JP | 60206121 | 3/1959 |
| GB | 518993 | 3/1940 | JP | 57043529 | 8/1980 |
| GB | 537609 | 6/1941 | JP | 57126117 | 5/1982 |
| GB | 540456 | 10/1941 | JP | 59076156 | 10/1982 |
| GB | 589071 | 6/1947 | JP | 59159642 | 2/1983 |
| GB | 666883 | 2/1952 | JP | 6264964 | 9/1985 |
| GB | 685416 | 1/1953 | JP | 1129737 | 5/1989 |
| GB | 702892 | 1/1954 | JP | 62320631 | 6/1989 |
| GB | 715226 | 9/1954 | JP | 2017474 | 1/1990 |
| GB | 723457 | 2/1955 | JP | 3245748 | 2/1990 |
| GB | 739962 | 11/1955 | JP | 4179107 | 11/1990 |
| GB | 763761 | 12/1956 | JP | 318253 | 1/1991 |
| GB | 805721 | 12/1958 | JP | 424909 | 1/1992 |
| GB | 827600 | 2/1960 | JP | 5290947 | 4/1992 |
| GB | 854728 | 11/1960 | JP | 6196343 | 12/1992 |
| GB | 870583 | 6/1961 | JP | 6233442 | 2/1993 |
| GB | 913386 | 12/1962 | JP | 6325629 | 5/1993 |
| GB | 965741 | 8/1964 | JP | 7057951 | 8/1993 |
| GB | 992249 | 5/1965 | JP | 7264789 | 3/1994 |

| | | | | | | |
|---|---|---|---|---|---|---|
| JP | 8167332 | 12/1994 | | WO | WO9745930 | 12/1997 |
| JP | 7161270 | 6/1995 | | WO | WO9745931 | 12/1997 |
| JP | 8264039 | 11/1995 | | WO | WO9745932 | 12/1997 |
| JP | 9200989 | 1/1996 | | WO | WO9745933 | 12/1997 |
| JP | 8036952 | 2/1996 | | WO | WO97/45934 | 12/1997 |
| JP | 8167360 | 6/1996 | | WO | WO9745935 | 12/1997 |
| LU | 67199 | 3/1972 | | WO | WO97/45936 | 12/1997 |
| SE | 90308 | 9/1937 | | WO | WO9745937 | 12/1997 |
| SE | 305899 | 11/1968 | | WO | WO9745938 | 12/1997 |
| SE | 255156 | 2/1969 | | WO | WO9745939 | 12/1997 |
| SE | 341428 | 12/1971 | | WO | WO9747067 | 12/1997 |
| SE | 453236 | 1/1982 | | WO | WO9820595 | 5/1998 |
| SE | 457792 | 6/1987 | | WO | WO9820596 | 5/1998 |
| SE | 502417 | 12/1993 | | WO | WO9820597 | 5/1998 |
| SU | 792302 | 1/1971 | | WO | WO 98/20598 | 5/1998 |
| SU | 425268 | 9/1974 | | WO | WO9820600 | 5/1998 |
| SU | 1019553 | 1/1980 | | WO | WO 98/20602 | 5/1998 |
| SU | 694939 | 1/1982 | | WO | WO9821385 | 5/1998 |
| SU | 955369 | 8/1983 | | WO | PCT/FR 98/00468 | 6/1998 |
| SU | 1511810 | 5/1987 | | WO | WO9827634 | 6/1998 |
| WO | WO 8202617 | 8/1982 | | WO | WO9827635 | 6/1998 |
| WO | WO8502302 | 5/1985 | | WO | WO9827636 | 6/1998 |
| WO | WO9011389 | 10/1990 | | WO | WO9829928 | 7/1998 |
| WO | WO9012409 | 10/1990 | | WO | WO9829929 | 7/1998 |
| WO | PCT/DE 90/00279 | 11/1990 | | WO | WO9829930 | 7/1998 |
| WO | WO9101059 | 1/1991 | | WO | WO9829931 | 7/1998 |
| WO | WO9101585 | 2/1991 | | WO | WO9829932 | 7/1998 |
| WO | WO9107807 | 3/1991 | | WO | WO9833731 | 8/1998 |
| WO | PCT SE 91/00077 | 4/1991 | | WO | WO9833736 | 8/1998 |
| WO | WO9109442 | 6/1991 | | WO | WO9833737 | 8/1998 |
| WO | WO 91/11841 | 8/1991 | | WO | WO9834238 | 8/1998 |
| WO | WO8115862 | 10/1991 | | WO | WO 98/34239 | 8/1998 |
| WO | WO 91/15755 | 10/1991 | | WO | WO9834240 | 8/1998 |
| WO | WO9201328 | 1/1992 | | WO | WO9834241 | 8/1998 |
| WO | WO9203870 | 3/1992 | | WO | WO9834242 | 8/1998 |
| WO | WO9321681 | 10/1993 | | WO | WO9834243 | 8/1998 |
| WO | WO9406194 | 3/1994 | | WO | WO9834244 | 8/1998 |
| WO | WO9518058 | 7/1995 | | WO | WO9834245 | 8/1998 |
| WO | WO95/22153 | 8/1995 | | WO | WO9834246 | 8/1998 |
| WO | WO9524049 | 9/1995 | | WO | WO9834247 | 8/1998 |
| WO | WO9622606 | 7/1996 | | WO | WO9834248 | 8/1998 |
| WO | WO9622607 | 7/1996 | | WO | WO9834249 | 8/1998 |
| WO | PCT/CN 96/00010 | 10/1996 | | WO | WO9834250 | 8/1998 |
| WO | WO9630144 | 10/1996 | | WO | WO9834309 | 8/1998 |
| WO | WO9710640 | 3/1997 | | WO | WO9834312 | 8/1998 |
| WO | WO9711831 | 4/1997 | | WO | WO9834315 | 8/1998 |
| WO | WO9716881 | 5/1997 | | WO | WO9834321 | 8/1998 |
| WO | WO 97/29494 | 8/1997 | | WO | WO9834322 | 8/1998 |
| WO | WO9745288 | 12/1997 | | WO | WO9834323 | 8/1998 |
| WO | WO9745847 | 12/1997 | | WO | WO9834325 | 8/1998 |
| WO | WO9745848 | 12/1997 | | WO | WO9834326 | 8/1998 |
| WO | WO9745906 | 12/1997 | | WO | WO9834327 | 8/1998 |
| WO | WO9745907 | 12/1997 | | WO | WO9834328 | 8/1998 |
| WO | WO 97/45908 | 12/1997 | | WO | WO9834329 | 8/1998 |
| WO | WO97/45908 | 12/1997 | | WO | WO9834330 | 8/1998 |
| WO | WO9745912 | 12/1997 | | WO | WO9834331 | 8/1998 |
| WO | WO9745914 | 12/1997 | | WO | WO9829927 | 9/1998 |
| WO | WO9745915 | 12/1997 | | WO | WO 98/40627 | 9/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |
| WO | WO9745927 | 12/1997 | | WO | WO9917425 | 4/1999 |
| WO | WO9745928 | 12/1997 | | WO | WO9917426 | 4/1999 |
| WO | WO9745929 | 12/1997 | | WO | WO9917427 | 4/1999 |

| | | |
|---|---|---|
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Analysis of faulted Power Systems; P Anderson, Iowa State University Press / Ames, Iowa, 1973, pp 255–257.

36–Kv. Generators Arise from insulation Research; P. Sidler; *Electrical World* Oct. 15, 1932, ppp 524.

Oil Water cooled 300 MW turbine generator;L.P. Gnedin et al;*Electrotechnika* , 1970, pp 6–8.

J&P Transformer Book 11$^{th}$ Edition;A. C. Franklin et al; owned by Butterworth—Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HVDC Converters; Main Characteristics and Comparative Advantages; J.Arrillaga et al; *Electra*.No. 149, Aug. 1993, pp 19–37.

Our flexible friend article; M. Judge; *New Scientist*, May 10, 1997 , pp 44–48.

In–Service Performance of HVDC Converter transformers and oil–cooled smoothing reactors; G.L. Desllets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–642.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appilel Superconductivity, vol. 7, No. 2, Jun. 1997, pp 840–843.

High Speed Syncrhonous Motors Adjustable Speed Drives; ASEA Generation Pamphlet OG 135–101 E, Jan. 1985, pp 1–4.

Billig burk motar overtonen; A. Felidin; *ERA* (TEKNIK) Aug. 1994, pp 26–28.

400 kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution*, Dec. 1996, pp 49–54.

Investigation and Use of Asynchronized Machines in Power Systems*; N.I.Blotskil et al; *Elektrichestvo*, No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 426–432.

MPTC: An economical alternative to universal power flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems– new concepts and applications; E. Wirth et al; ABB Review Apr. 1997, p 12–20.

Tranforming transformers; S. Mehta et al; *IEEE Spectrum*, Jul. 1997, pp. 43–49.

A study of equipment sizes and constraints for a unified power flow controller; J. Blan et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp91–98.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551; Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivy to electric motor design; J.S. Edmonds et al; IEEE Transactions on Energy Conversion Jun. 1992, No. 2 , pp 322–329.

Power Electronics and Variable Frequency Drives; B. Bimal; IEEE Industrial Electronics—Technology and Applications, 1996, pp. 356.

Properties of High Plymer Cement Mortar; M. Tamai et al; *Science & Technology in Japan, No. 63* ; 1977, pp 6–14.

Weatherability of Polymer–Modified Mortars after Ten–Year Outdoor Exposure in Koriyama and Sapporo; Y. Ohama et al; *Science & Technology in Japan No. 63*; 1977, pp 26–31.

SMC Powders Open New Magnetic Applications; M. Persson (Editor); *SMC Update* ,vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

Low–intensy laser–triggering of rail–gaps with magnesium–aerosol switching–gases; W. FREY; 11th International Pulse Power Conference, 1997, Baltimore, USA Digest of Technical Papers, p. 322–327.

Shipboard Electrical Insulation; G. L. Moses, 1951, pp2&3.
ABB Elkrafthandbok; ABB AB; 1988 ; pp274–276.

Elkraft teknisk Handbok, 2 Elmaskiner; A. Alfredsson et al; 1988, pp 121–123.

High Voltage Gables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handles; K.. Bienick, KSB; Feb. 15, 1988; pp9–17.

High Voltage Generators; G. Beschastnov et al; 1977; vol. 48. No. 6 pp1–7.

Eine neue Type von Unterwassermotoren; Electrotechnik und Maschinenbam, 49; Aug. 1931; pp2–3.

Problems in design of the 110–5OokV high–voltage generators; Nikiti et al; World Electrotechnical Congress; Jun. 21–27, 1977; Section 1. Paper #18.

Manufacture and Testing of Roebel bars; P. Marti et al; 1960, Pub.86, vol. 8, pp 25–31.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE Nov. 1984.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen– ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth stator; V.S. Kildishev et al/ No. 1, 1977 pp11–16.

Der Asynchronmotor als Antrieb stopfbcichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys. vol. 64 #10 Nov. 1988, pp5376–5378.

An EHV bulk Power transmission line Made with Low Loss XLPE Cable;Ichihara et al; Aug. 1992; pp3–6.

Underground Transmission Systems Reference Book; 1992;pp16–19; pp36–45; pp67–81.

Power System Stability and Control; P. Kundur, 1994; pp23–25;p. 767.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Connections, Part 1: Equivalent circuit representation and Steady–State Analysis; R. Schiferl et al; Aug. 1983; pp2685–2693.

Reactive Power Compensation; T. Petersson; 1993; pp 1–23.
Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 6OkV; G. Aicholzer; Sep. 1974, pp249–255.

Advanced Turbine–generators– an assessment; A. Appleton, et al; International Conf. Proceedings, Lg HV Elec. Sys. Paris, FR, Aug.–Sep. 1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

POWERFORMER ™: A giant in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

* cited by examiner

WIND POWER PLANT

TECHNICAL FIELD

This invention relates to a wind power plant which is intended for connection to distribution or transmission networks, hereinafrer called power networks. The invention also relates to an electric generator for high voltage in a wind power station intended for the above-mentioned purpose. The invention further relates to a variable speed system containing the above-mentioned generator.

BACKGROUND ART

A wind power plant can be a single grid-connected unit but usually consists of a number of wind turbines forming a wind power farm. Each wind turbine is equipped with an electric generator located in a hub. The generator can be synchronous or of the induction type. Induction generators are more common today because they are cheaper and more robust. The synchronous generator can produce reactive power which is an advantage over the induction machine. The size of the wind turbine is today typically 100–3000 kW with many commercial turbines around 500 kw. The trend is for higher power and voltage of the generator. The voltage levels of today are from 400 V up to a few kV. In most wind farms, it is necessary to equip each wind turbine with a transformer that steps up the voltage to a local distribution voltage that may be typically 10–30 kV. Thus this transformer and the generator constitute integrated parts of a plant. Individual units are interconnected in tree branch or ring networks with high-voltage cables. The distribution network may be connected to a transmission network by a single or a couple of power transformers. The transformers entail an extra cost and also have the drawback that the total efficiency of the system is reduced. They are also a fire hazard since they contain transformer oil which can leak out in the event of failure or vandalism.

If, therefore, it were possible to manufacture electric generators for considerably higher voltages, at least the distribution transformer could be eliminated. It is possible with today's generator technology to make a 10 kV generator and thus eliminate the distribution transformer, but the cost would be far higher than a more typical 660 V machine. Furthermore today's stator winding insulation technology is sensitive to temperature variations, humidity and salt that a wind turbine generator may be exposed to. This makes it unrealistic with today's technology to dispose of the distribution transformers.

A high-voltage generator has a magnetic circuit that comprise a laminated core, e.g. of sheet steel with a welded construction. To provide ventilation and cooling the core is often divided into stacks with radial and/or axial ventilation ducts. The winding of the magnetic circuit is disposed in slots in the core, the slots generally having a cross section in the shape of a rectangle or trapezium.

In multi-phase high-voltage electric generators the windings are made as either single or double layer windings. With single layer windings there is only one coil side per slot, whereas with double layer windings there are two coil sides per slot. By "coil side" is meant one or more conductors combined vertically or horizontally and provided with a common coil insulation, i.e. an insulation designed to withstand the rated voltage of the generator to earth.

Double-layer windings are generally made as diamond windings whereas single layer windings in the present context can be made as diamond or flat windings only one (possibly two) coil width exists in diamond windings whereas flat windings are made as concentric windings, i.e. with a widely varying coil width. By "coil width" is meant the distance in arc dimension between two coil sides pertaining to the same coil.

Normally all large machines are made with doublelayer windings and coils of the same size. Each coil is placed with one side in one layer and the other side in the other layer. This means that all coils cross each other in the coil end. If there are more than two layers these crossings complicate the winding work and the coil end is less satisfactory.

It is considered that coils for rotating generators can be manufactured with good results within a voltage range of 3–20 kV.

In theory, it is known how to obtain larger voltage levels. Such generators are described, for instance, in US-A-4429244, US-A-4164672 and US-A-3743867. However, the machine designs according to the above publications do not permit optimal utilization of the electromagnetic material in the stator.

There are also wind turbines that operate at variable turbine speed. This operation mode is advantageous because the aerodynamic efficiency can be maximized. Variable speed systems employ two generators with different numbers of poles or generators with windings that can be connected for two-speed operation. Variable speed can also be obtained by means of a frequency converter. A variable speed system is simplified when a synchronous generator is used because a simple diode rectifier can be used between generator and DC-link. The two most common inverter types are line commutated and force-commutated. These two types of inverters produce different types of harmonics and hence require different line filters. The line-commutated inverter is equipped with thyristors which produces harmonic current that are turned into voltage harmonics on the grid. To eliminate these harmonics a large grid filter must be used. Another drawback is that the line-commutated inverter consumes reactive power. A force-commutated inverter can create its own three-phase voltage system and if the inverter is connected to the grid it can freely choose which power factor to use and in which direction the power should be directed. By the use of Pulse Width Modulation, PWM, the low frequency harmonics are eliminated and the first harmonics have a frequency around the switching frequency of the inverter. The most interesting valve for a PWM inverter is the insulated Gate Bipolar Transistor, IGBT. With the latest IGBT-valves, a switching frequency of from 5 to 10 kHz would be used. Today's IGBT valves are limited in voltage and power so that a single six-pulse inverter can handle about 1 MVA at 1–2 kV.

DESCRIPTION OF THE INVENTION

The object of the invention is thus to provide an electric generator which can be used in a wind power plant for such high voltage that the distribution transformer can be omitted, i.e. a plant in which the electric generators are intended for considerably higher voltages than conventional machines of corresponding type, in order to be able to execute direct connection to power networks at all types of high voltages, in particular exceeding the 20 kV considered as an upper limit today. Another object of the invention is to provide an electric generator that is not sensitive to salt, humidity or temperature variations, as are present known high-voltage windings. A third object of the invention is to provide a variable speed alternative for the resulting high voltage if the distribution transformer is eliminated.

By use of solid insulation in combination with the other features defined, the network can be supplied without the use of an intermediate step-up transformer even at network voltages considerably in excess of 20 kV. Furthermore, this insulation is completely insensitive to salt, humidity and temperature variations. The elimination of the transformer entails great savings and also results in several other simplifications and savings.

Wind power plants are often arranged in farmland and close to populated areas. In a conventional wind power plant the transformer must be protected from causing hazard by explosion risk or leaking oil. A concrete transformer station may have to be built at the foundation of each wind turbine unit. In future offshore locations it would be difficult and costly to repair and maintain the transformer. Thus if the transformer is eliminated, the transformer housing is eliminated and it is also possible to use thinner cables to the generator. Furthermore the reactive power consumption and the electrical losses of the transformer are eliminated. The removal of the transformer also eliminates a set of breaker units previously necessary between the transformer and the generator.

The plant according to the invention also enables several connections with different voltage levels to be arranged, i.e. the invention can be used for all auxiliary power in the power station. Another way to supply auxiliary power to each wind turbine is to have a cheap low-voltage network in parallel with the distribution network.

According to another aspect of the present invention there is provided an electric generator as claimed in the ensuing claim 25.

In a particularly preferred embodiment of the plant and generator respectively, the solid insulation system comprises at least two spaced apart layers, e.g. semiconducting layers, each layer constituting essentially an equipotential surface, and an intermediate solid insulation therebetween, at least one of the layers having substantially the same coefficient of thermal expansion as the solid insulation.

This embodiment constitutes an expedient embodiment of the solid insulation that in an optimal manner enables the windings to be directly connected to the high-voltage network and where harmonization of the coefficients of thermal expansion eliminates the risk of defects, cracks or the like upon thermal movement in the winding.

It should be evident that the windings and the insulating layers are flexible so that they can be bent. It should also be pointed out that the plant according to the invention can be constructed using either horizontal or vertical generators.

A major and essential difference between known technology and the embodiment according to the invention is that an electric generator with a magnetic circuit is arranged to be directly connected via only breakers and isolators, to a high supply voltage, typically in the vicinity of between 2 and 50 kv, preferably higher than 10 kV. The magnetic circuit comprises a laminated core having at least one winding consisting of a threaded cable with one or more permanently insulated conductors having a semiconducting layer both at the conductor and outside the insulation, the outer semiconducting layer being connected to earth potential.

To solve the problems arising with direct connection of electric machines to all types of high-voltage power networks, the generator in the plant according to the invention has a number of features as mentioned above, which differ distinctly from known technology. Additional features and further embodiments are defined in the dependent claims and are discussed in the following.

Such features mentioned above and other essential characteristics of the generator and thus of the wind-power plant according to the invention include the following:

The winding of the magnetic circuit is produced from a cable having one or more permanently insulated conductors with a semiconducting layer at both conductor and sheath. Some typical conductors of this type are XLPE cable or a cable with EP rubber insulation which, however, for the present purpose are further developed both as regards the strands in the conductor and the nature of the outer sheath.

Cables with circular cross section are preferred, but cables with some other cross section may be used in order, for instance, to obtain better packing density.

Such a cable allows the laminated core to be designed according to the invention in a new and optimal way as regards slots and teeth.

The winding is preferably manufactured with insulation in steps for best utilization of the laminated core.

The winding is preferably manufactured as a multilayered, concentric cable winding, thus enabling the number of coil-end intersections to be reduced.

The slot design is suited to the cross section of the winding cable so that the slots are in the form of a number of cylindrical openings running axially and/or radially outside each other and having an open waist running between the layers of the stator winding.

The design of the slots is adjusted to the relevant cable cross section and to the stepped insulation of the winding. The stepped insulation allows the magnetic core to have substantially constant tooth width, irrespective of the radial extension.

The above-mentioned further development as regards the strands entails the winding conductors consisting of a number of impacted strata/layers, i.e. insulated strands that from the point of view of an electric machine, are not necessarily correctly transposed, uninsulated and/or insulated from each other.

The above-mentioned further development as regards the outer sheath entails that at suitable points along the length of the conductor, the outer sheath is cut off, each cut partial length being connected directly to earth potential.

The use of a cable of the type described above allows the entire length of the outer sheath of the winding, as well as other parts of the plant, to be kept at earth potential. An important advantage is that the electric field is close to zero within the coil-end region outside the outer semiconducting layer. With earth potential on the outer sheath the electric field need not be controlled. This means that no field concentrations will occur either in the core, in the coil-end regions or in the transition between them.

The mixture of insulated and/or uninsulated impacted strands, or transposed strands, results in low stray losses. The cable for high voltage used in the magnetic circuit winding is constructed of an inner core/conductor with a plurality of strands, at least two semiconducting layers, the innermost being surrounded by an insulating layer, which is in turn surrounded by an outer semiconducting layer having an outer diameter in the order of 10–40 mm and a conductor area in the order of 10–200 mm$^2$.

BRIEF DESCRIPTION OF THE DRAWINGS

Embodiments of the invention will now be described in more detail, by way of example only, with particular reference to the accompanying drawings, in which.

DESCRIPTION OF A PREFERRED EMBODIMENT

Figure 1:
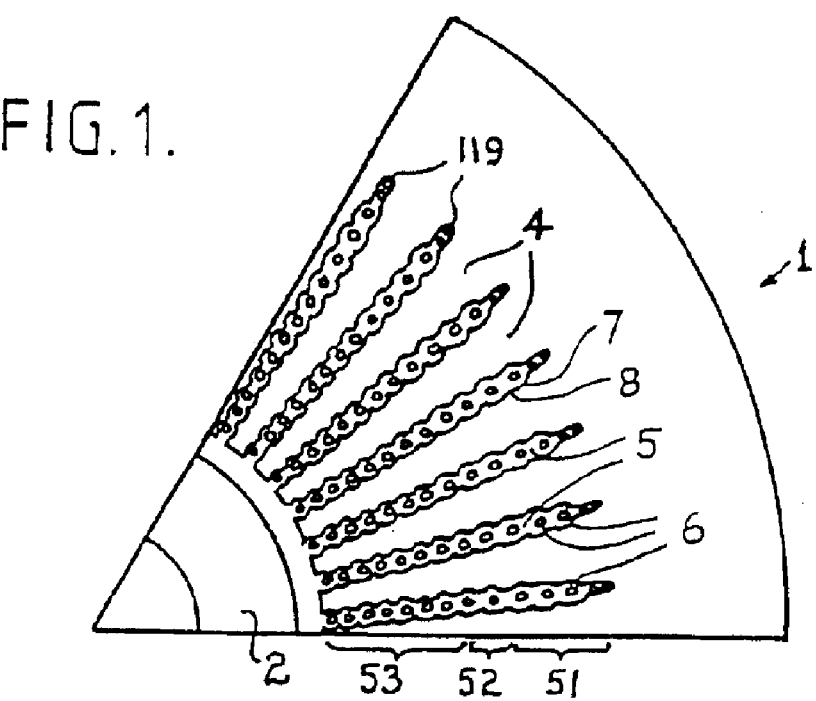
FIG. 1 is a schematic axial end view of a sector of the stator of an electric generator of a wind power plant according to the invention.
Figure 3:
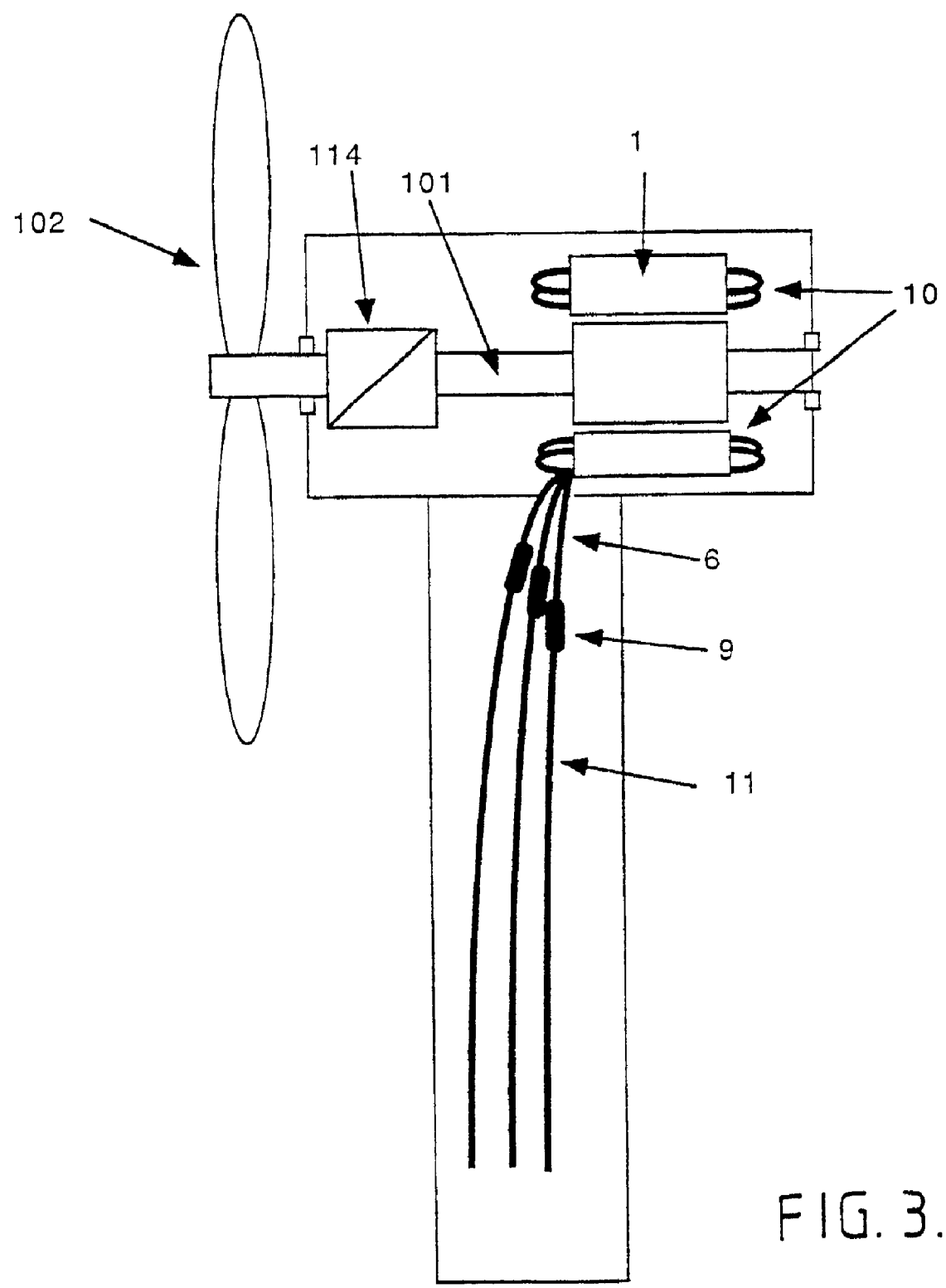
FIG. 3 is a simplified view, partially in section, of a wind-power generator arrangement according to the invention.

FIG. 1 shows part of a stator 1 and rotor 2 of a generator 100 (see FIG. 3) of a wind power plant according to the invention. The stator 1 comprises, in conventional manner, a laminated core. FIG. 1 shows a sector of the generator corresponding to one pole pitch. From a yoke part 3 of the core situated radially outermost, a number of teeth 4 extend radially in towards the rotor 2 and are separated by slots 5 in which the stator winding is arranged. Cables 6 forming this stator winding, are highvoltage cables which may be of substantially the same type as those used for power distribution, i.e. XLPE (crosslinked polyethylene) cables. One difference is that the outer, mechanically-protective PVC-layer, and the metal screen normally surrounding such power distribution cables are eliminated so that the cable for the present application comprises only the conductor, an insulating layer and at least one semiconducting layer on each side of the insulating layer. The cables 6 are illustrated schematically in FIG. 1, only the conducting central part of each cable part or coil side being shown. As can be seen, each slot 5 has a varying cross section with alternating wide parts 7 and narrow parts 8. The wide parts 7 are substantially circular and surround the cabling, the waist parts between these forming narrow parts 8. The waist parts serve to radially fix the position of each cable. The cross section of the slot 5 also narrows radially inwards. This is because the voltage on the cable parts is lower the closer to the radially inner part of the stator 1 they are situated. Thinner cabling can therefore be used there, whereas wider cabling is necessary radially further out. In the example illustrated cables of three different dimensions are used, arranged in three correspondingly dimensioned sections 51, 52, 53 of slots 5. An auxiliary power winding 9 is arranged furthest out in the slot 5.

Figure 2:
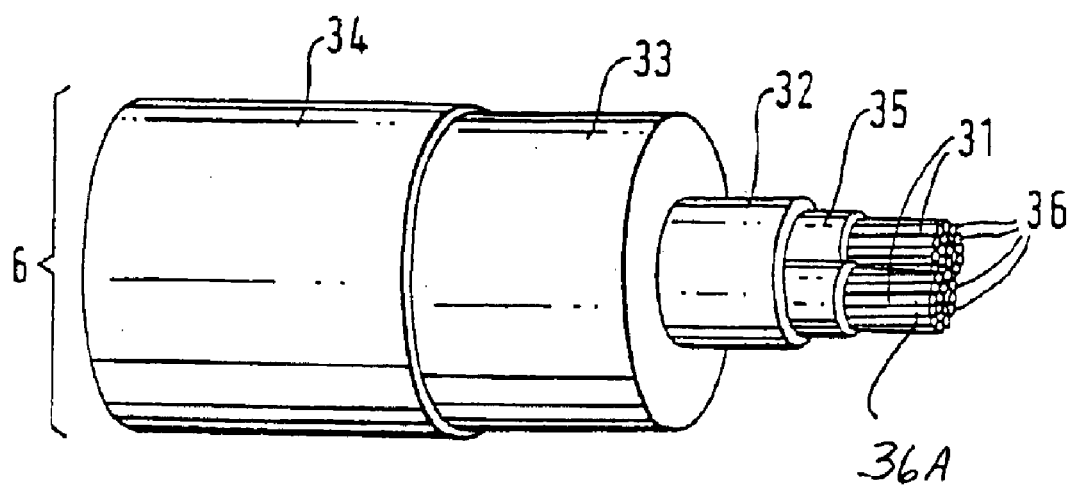
FIG. 2 is an end view, partially stripped, of a cable used in the winding of the stator according to FIG. 1.

FIG. 2 shows a step-wise stripped and view of a high-voltage cable for use in the present invention. The high-voltage cable 6 comprises one or ore conductors 31, each of which comprises a number of strands 36, e.g. of copper, which together form a central conducting means of generally circular cross section, which may be insulated. At least one of the strands 36A is uninsulated. These conductors 31 are arranged in the middle of the high-voltage cable 6 and in the shown embodiment each is surrounded by a part insulation 35. However, it is feasible for the part insulation 35 to be omitted on one of the conductors 31. In the present embodiment of the invention the conductors 31 are together surrounded by a first semiconducting layer 32. Around this first semiconducting layer 32 is a solid insulating layer 33, e.g., XLPE insulation, which is in turn surrounded by a second semiconducting layer 34. Thus the concept "high-voltage cable" in this application need not include any metallic screen or outer PVC-layer of the type that normally surrounds such a cable for power distribution.

A wind-power plant with a magnetic circuit of the type described above is shown in FIG. 3 where the generator 100 is driven by a wind turbine 102 via a shaft 101 and a gearbox 114. The stator 1 of the generator 100 carries stator windings 10 which are built up of the cable 6 described above. The cable 6 is unscreened and changes to a screened cable 11 at cable splicing 9.

Figure 4:
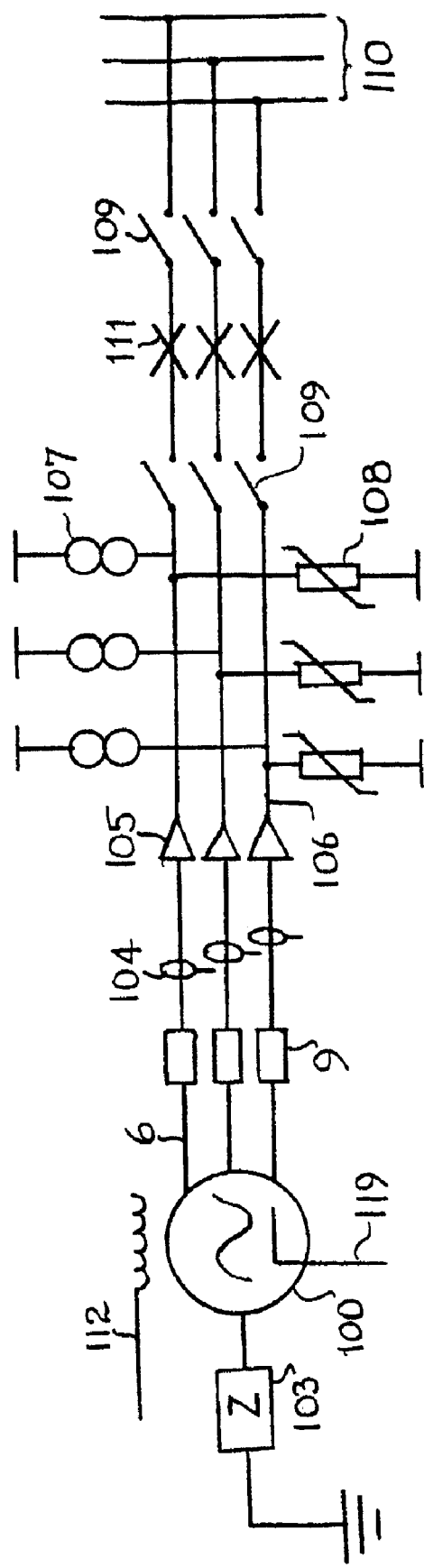
FIG. 4 is a circuit diagram for the wind-power plant according to the invention.

FIG. 4 illustrates a wind power plant according to the present invention. In conventional manner, the generator 100 has an excitation winding 112 and one (or more) auxiliary power winding(s) 113. In the illustrated embodiment of the plant according to the invention the generator 100 is Y-connected and the neutral earthed via an impedance 103. It can also be seen from FIG. 4 that the generator 100 is electrically connected via the cable splicing 9 to the screened cable 11 (see also FIG. 3). In some cases it would be possible to omit the cable splicing and let the generator cable extend down the tower of the wind turbine. The cable 11 is provided with current transformers 104 in conventional manner, and terminates at 105. After this point 105 the electric plant in the embodiment shown continues with busbars 106 having branches with voltage transformers 107 and surge arresters 108. However, the main electric supply takes place via the busbars 106 directly to the distribution or transmission network 110 via isolator 109 and circuit-breaker 111.

Although the generator and the plant in which this generator is included have been described and illustrated in connection with an embodiment by way of example, it should be obvious to one skilled in that art that several modifications are possible without departing from the inventive concept. The gearing may be omitted if using a low-speed generator. The generator may be earthed directly without any impedance. The auxiliary windings can be omitted, as also can other components shown. Although the invention has been exemplified with a three-phase plant, the number of phases may be more or less. The generator can be connected to the grid via a frequency convertor containing a rectifier, a DC-link and an inverter. Unlike conventional variable-speed systems, the valves of the rectifier and inverter would probably have to be series-connected because of the high voltage.

Although it is preferred that the electrical insulation system for the winding should be extruded in position, it is possible to build up an electrical insulation system from tightly wound, overlapping layers of film or sheet-like material. Both the semiconducting layers and the electrically insulating layer can be formed in this manner. An insulation system can be made of an allsynthetic film with inner and outer semiconducting layers or portions made of polymeric thin film of, for example, PP, PET, LDPE or HDPE with embedded conducting particles, such as carbon black or metallic particles and with an insulating layer or portion between the semiconducting layers or portions.

For the lapped concept a sufficiently thin film will have butt gaps smaller than the so-called Paschen minima, thus rendering liquid impregnation unnecessary. A dry, wound multilayer thin film insulation has also good thermal properties.

Another example of an electrical insulation system is similar to a conventional cellulose based cable, where a thin cellulose based or synthetic paper or non-woven material is lap wound around a conductor. In this case the semiconducting layers, on either side of an insulating layer, can be made of cellulose paper or non-woven material made from fibres of insulating material and with conducting particles embedded. The insulating layer can be made from the same base material or another material can be used.

Another example of an insulation system is obtained by combining film and fibrous insulating material, either as a laminate or as co-lapped. An example of this insulation system is the commercially available so-called paper polypropylene laminate, PPLP, but several other combinations of film and fibrous parts are possible. In these systems various impregnations such as mineral oil can be used.

In this specification "semiconducting material" means a substance which has a considerably lower conductivity than an electric conductor but which does not have such a low conductivity that it is an electric insulator. Suitably, but not essentially, the semiconducting material will have a resistivity of $1-10^5$ ohm-cm, preferably 10–500 ohm-cm and most preferably from 10 to 100 ohm-cm, typically 20 ohm-cm.

What is claimed is:

1. A wind power plant comprising at least one high voltage rotary generator coupled to a turbine via shaft means and having a stator with at least one winding and a rotor, wherein the at least one stator winding comprises:
   a cable including a current carrying conductor, an inner layer having semiconducting properties surrounding the current carrying conductor, a solid insulation layer surrounding the inner layer and an outer layer having semiconducting properties surrounding the solid insulation layer, wherein the current-carrying conductor comprises a plurality of electrically insulated strands and at least one uninsulated strand in contact with the inner layer.

2. The plant as claimed in claim 1, wherein the inner and outer layers each provide essentially an equipotential surface, and the insulating layer has substantially the same coefficient of thermal expansion as the semiconducting layers.

3. The plant as claimed in claim 1, wherein the layer is at substantially the same potential as the said conductor.

4. The plant as claimed in claim 1, wherein the outer semiconducting layer is arranged to form essentially an equipotential surface surrounding the conductor.

5. The plant as claimed in claim 1, wherein said outer semiconducting layer is connected to a predefined potential.

6. The plant as claimed in claim 5, the predefined potential is earth potential.

7. The plant as claimed in claim 1, wherein the rotor is equipped with a short-circuited winding, resulting in a generator of the induction type.

8. The plant as claimed in claim 1, wherein the rotor is equipped with a field winding in which DC-current flows, resulting in a generator of the synchronous type.

9. The plant as claimed in claim 1, wherein the conductor has a conductor area of between 10 and 200 mm² and the cable has an outer cable diameter of between 10 and 40 mm.

10. The plant as claimed in claim 1, wherein the said generator is designed for high voltage and is arranged to supply the out-going electric network directly without any intermediate connection of a transformer.

11. The plant as claimed in claim 10, wherein said generator is earthed via an impedance.

12. The plant as claimed in claim 10, wherein said generator is directly earthed.

13. The plant as claimed claim 10, wherein the generator is arranged to generate power to various voltage levels.

14. The plant as claimed claim 13, wherein one of said voltage levels is arranged to generate auxiliary power and that the auxiliary power is arranged to be generated from a separate winding in the generator.

15. The plant as claimed in claim 1 wherein it comprises several generators, each of which lacks an individual step-up transformer, but which, via a system transformer common to the generators, is connected to the transmission or distribution network.

16. The plant as claimed in claim 1 wherein the winding of the or each generator is arranged for self-regulating field control and lacks auxiliary means for control of the field.

17. The plant as claimed in claim 1 wherein the windings of the or each generator can be connected for multiple-speed operation using different numbers of poles.

18. The plant as claimed in claim 1 wherein at least one wind turbine is equipped with two or more generators having different numbers of poles so that multiple-speed operation is possible.

19. The plant as claimed in claim 1 wherein the or each generator is connected to a frequency convertor comprising a rectifier, a DC-link and an inverter.

20. The plant as claimed in claim 19, wherein series connected valves are used in the inverter and the rectifier.

21. The plant as claimed in claim 20, wherein the inverter is net commutated with current-stiff DC-link.

22. The plant as claimed in claim 20, wherein the inverter is self commutated and comprises series-connected IGBTs.

23. The wind power plant according to claim 1, including coupling means for connecting the plant to a transmission or distribution network having a voltage of between 2 and 50 kV.

24. An electric generator for high voltage included in a wind power plant in which the generator is coupled to a turbine via shaft means, said generator comprising a stator with at least one stator wherein the at least one stator winding comprises a cable including a current carrying conductor, an inner semiconducting layer surrounding the conductor, a solid insulation layer surrounding the inner layer and an outer semiconducting layer surrounding the solid insulation, wherein the current-carrying conductor comprises a plurality of electrically insulated strands and at least one uninsulated strand in contact with the inner layer.

25. The electric generator of claim 24 including coupling means for coupling the generator directly to a transmission or distribution network having a voltage of between 2 to 50 kV.

* * * * *